(12) United States Patent
Kim

(10) Patent No.: US 7,066,520 B2
(45) Date of Patent: Jun. 27, 2006

(54) CARGO SCREEN HANGER FIXTURE FOR A VEHICLE

(75) Inventor: Yong Chae Kim, Ansan (KR)

(73) Assignee: Kia Motors Corporation, Seoul (KR)

( * ) Notice: Subject to any disclaimer, the term of this patent is extended or adjusted under 35 U.S.C. 154(b) by 82 days.

(21) Appl. No.: 10/886,491

(22) Filed: Jul. 7, 2004

(65) Prior Publication Data

US 2005/0073164 A1    Apr. 7, 2005

(30) Foreign Application Priority Data

Oct. 4, 2003    (KR) .................. 10-2003-0069008

(51) Int. Cl.
*B60R 5/04*    (2006.01)
(52) U.S. Cl. .................................................. 296/37.16
(58) Field of Classification Search ............. 296/37.16; 160/26, 269
See application file for complete search history.

(56) References Cited

U.S. PATENT DOCUMENTS 5,727,836 A * 3/1998 Hosoya ................... 296/37.16

FOREIGN PATENT DOCUMENTS

| JP | 62-113629 | * | 5/1987 |
| JP | 2003-004124 | | 8/2003 |

* cited by examiner

*Primary Examiner*—Joseph D. Pape
(74) *Attorney, Agent, or Firm*—Morgan Lewis & Bockius LLP

(57) ABSTRACT

A cargo screen hanger fixture for a vehicle, wherein a hooking lug is formed in a projecting way on one side of the housing cover coupled to the left and right ends of the cargo screen housing. The cargo screen hanger is fastened by being inserted between the bottom of the hooking lug and the top of the side garnish hanger to which the housing cover is joined and fastened.

6 Claims, 3 Drawing Sheets

CARGO SCREEN HANGER FIXTURE FOR A VEHICLE

CROSS-REFERENCE TO RELATED APPLICATIONS

This application claims priority of Korean Application No. 10-2003-0069008, filed Oct. 4, 2003, the disclosure of which is incorporated herein by reference.

FIELD OF THE INVENTION

The present invention relates to the cargo screen hanger fixture for a vehicle, and more particularly to hangers installed on left and right sides of the front end of the cargo screen, supported on upper and lower parts by a housing cover and side garnish hanger.

BACKGROUND OF THE INVENTION

Generally, a hatch-back type vehicle has a luggage compartment formed in its rear part and a cargo screen is installed over this luggage compartment. The cargo screen is unfolded or unrolled to hide the cargo loaded into the luggage compartment so it cannot be seen from outside. If needed, the cargo screen is folded or rolled up so that cargo can be loaded and carried in the luggage compartment.

Generally the hanger for the cargo screen lies on the supporting side garnishes. When the cargo screen is unfolded to cover the luggage compartment, it is tightly secured. However, when folded it can just lie loose. Thus, when the cargo screen is shaken up and down or left to right due to the vibration of a vehicle while the car is running, noise can be made as it rubs or hits other parts.

SUMMARY OF THE INVENTION

Embodiments of the present invention provide a cargo screen hanger fixture for a vehicle that can not only improve the product reliability, but also enhance the riding comfort by preventing the noise generated when the cargo screen rubs or hits other parts even in off-road driving. Preferably the hangers installed on the left and right sides of the front end of the cargo screen are supported on the upper and lower parts by a housing cover and side garnish hanger so that they do not shake.

In one preferred embodiment, a cargo screen hanger fixture for a vehicle of the present invention has the following features: it includes the housing cover coupled to the left and right ends of the cargo screen housing and the side garnish hanger to which the housing cover is joined and fastened; a hooking lug is formed in a projecting way on one side of the housing cover and the cargo screen hanger is fastened by being inserted between the bottom of the hooking lug and the top of the side garnish hanger; and a slanted rib is formed on one side of the bottom of the hooking lug. The hooking lug and rib are preferably made of elastic material of which the elasticity fastens the cargo screen hanger.

Thus, the cargo screen hanger fixture for a vehicle of the present invention does not allow the cargo screen hanger to be shaken up and down or left to right while the car is running as the cargo screen hanger is inserted and fastened between the hooking lug formed on the top of the housing cover and the side garnish hanger.

DETAILED DESCRIPTION OF THE INVENTION

Figure 1:
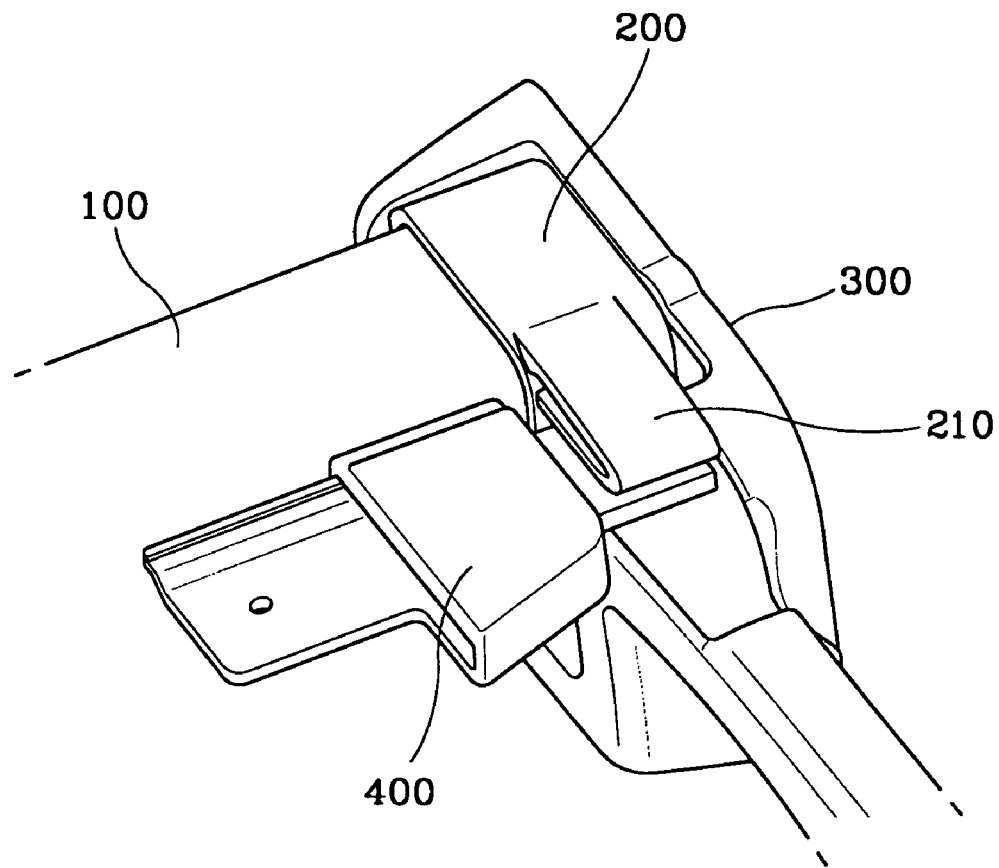
FIG. 1 is a perspective view of a cargo screen hanger fixture for a vehicle according to an embodiment of the present invention.
Figure 2:
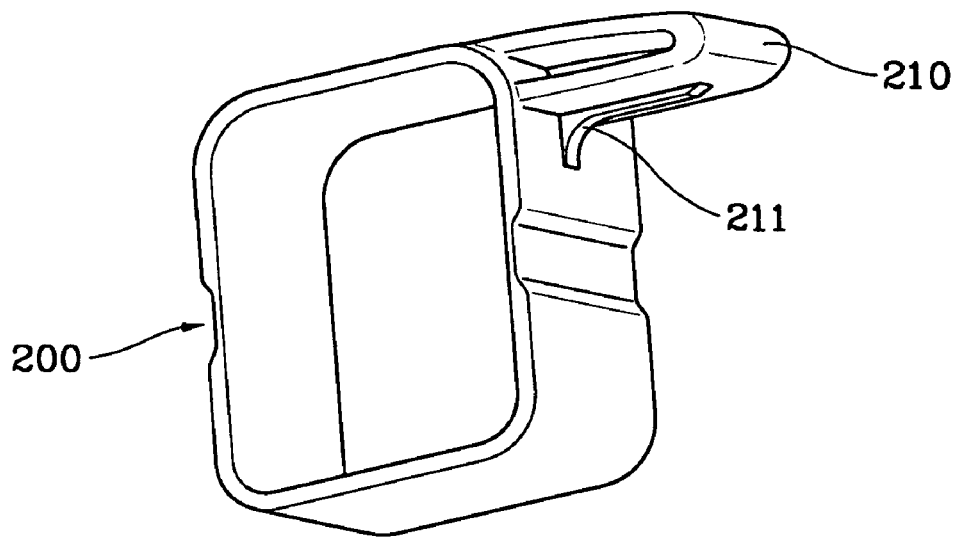
FIG. 2 is a perspective view of a housing cover according to an embodiment of the present invention.

As illustrated in FIGS. 1 and 2, in a cargo screen hanger fixture for a vehicle according to an embodiment of the present invention housing cover 200 is joined to the left and right ends of cargo screen housing 100 and the housing cover 200 is received in side garnish hanger 300. A hooking lug 210 is formed that projects on one side of the top of the housing cover 200. Cargo screen hanger 400 can then be secured by being inserted between the bottom of the hooking lug 210 and the top of the side garnish hanger 300. A sloping rib 211, slanted to one side, is formed at the bottom of the hooking lug 210. It is preferable that the hooking lug 210 and rib 211 be made of elastic material and the cargo screen hanger is fastened by means of this elasticity.

Figure 3:
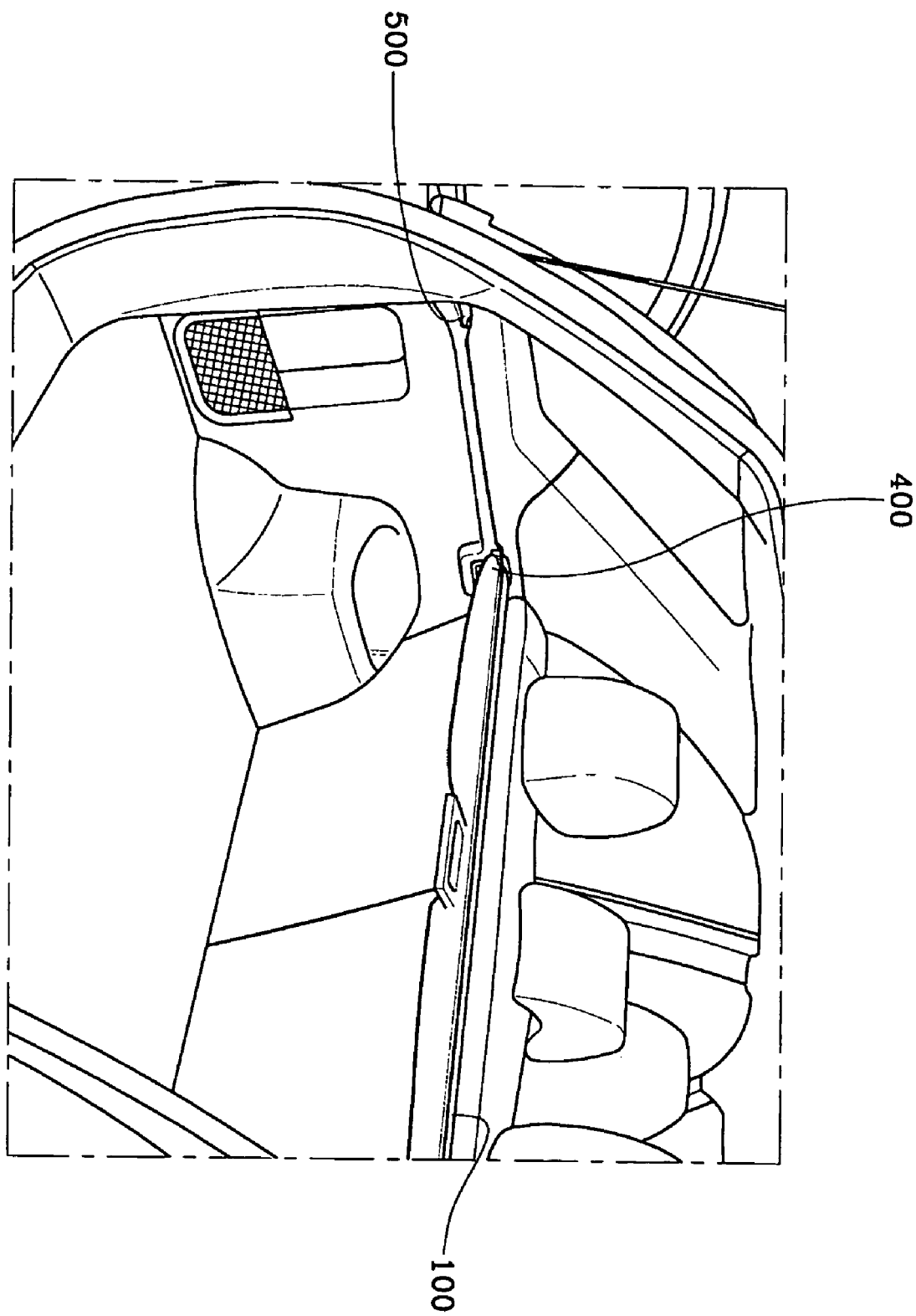
FIG. 3 is a perspective view of a luggage compartment when the cargo screen of the present invention is folded.
Figure 4:
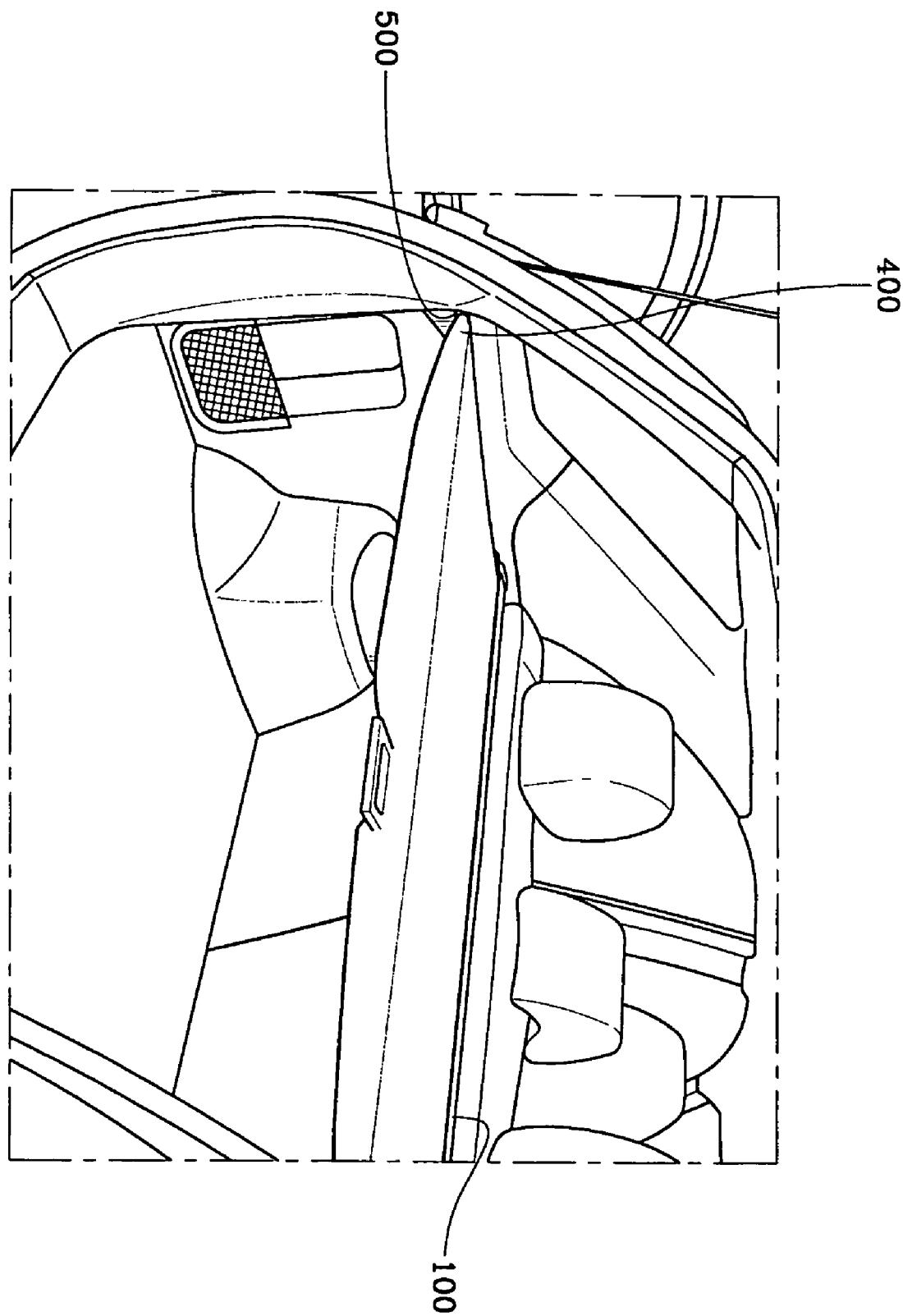
FIG. 4 is a perspective view of a luggage compartment when the cargo screen of the present invention is unfolded.

The operation and effects of a cargo screen hanger fixture for a vehicle of the present invention are explained in detail referring to the attached FIGS. 3 and 4. When the cargo screen is folded, the cargo screen hanger 400 is inserted into a gap formed between the bottom of hooking lug 210 and the top of the side garnish hanger 300. The top and bottom surfaces of the cargo screen hanger maintain the contact with the bottom of the hooking lug 210 and the top of the side garnish hanger 300 as illustrated in FIG. 1. The cargo screen hanger 400 can be smoothly inserted into and removed from the gap formed between the side garnish hanger 300 and the hooking lug 210 by facilitated sloping rib 211 slanted to one side at the bottom of the hooking lug 210 as illustrated in FIG. 2.

Thus, even when the vehicle user stores the vehicle with the cargo screen inserted if needed, the cargo screen hanger 400 installed on both sides of the front end of the cargo screen can not only be easily stored in a fixed state, without being shaken, but also as the hanger 400 is prevented from being shaken up and down and rubbing against the top of the side garnish hanger 300, such noise as rubbing noise is not made even at off-road running.

As shown in FIG. 4, when the cargo screen of the present invention is unfolded, the cargo screen hanger 400 is inserted into the hooking jaw 500 and the cargo screen is maintained in unfolded state.

As explained above, the present invention provides at least the following effects: a cargo screen hanger fixture for a vehicle of the present invention can not only improve the product reliability but also enhance the riding comfort by preventing the noise generated when the cargo screen rubs or hits other parts even at off-road driving as the cargo screen hangers installed on the left and right sides of the front end of the cargo screen are inserted between the top of the side garnish hanger and the hooking lug of the housing cover so that it doesn't shake.

What is claimed is:

1. A cargo screen hanger fixture for a vehicle which includes a housing cover coupled to left and right ends of a cargo screen housing and a side garnish hanger to which the housing cover is joined and fastened, wherein a hooking lug is formed in a projecting way on one side of the housing cover and a cargo screen hanger is fastened by being inserted between a bottom of the hooking lug and a top of the side garnish hanger.

2. The cargo screen hanger fixture for a vehicle as in claim 1, wherein a slanted rib is formed on the bottom of the hooking lug.

3. The cargo screen hanger fixture for a vehicle as in claim 1, wherein the hooking lug is made of an elastic material.

4. The cargo screen hanger fixture for a vehicle as in claim 2, wherein the rib is made of an elastic material.

5. A cargo screen hanger fixture for a vehicle configured to cooperate with side garnishes disposed on opposite sides of a vehicle luggage compartment, said cargo screen hanger fixture comprising:

a housing cover configured and dimensioned to be secured on an end of a cargo screen housing; and a hooking lug projecting from a side of the housing cover, said lug being positioned on said housing cover to provide a gap between a bottom side of said hooking lug and an associated top surface of the cooperating side garnish sufficient to receive a cargo screen hanger therein.

6. The cargo screen hanger fixture as in claim 5, wherein the bottom side of the hooking lug has an elastic rib.

* * * * *